United States Patent
Fujii et al.

(10) Patent No.: US 10,625,948 B2
(45) Date of Patent: Apr. 21, 2020

(54) CONVEYANCE APPARATUS, CONVEYANCE SYSTEM, AND METHOD OF CONTROLLING CONVEYANCE SYSTEM

(71) Applicant: CANON KABUSHIKI KAISHA, Tokyo (JP)

(72) Inventors: Nobuaki Fujii, Yokohama (JP); Takeshi Yamamoto, Fujisawa (JP)

(73) Assignee: CANON KABUSHIKI KAISHA, Tokyo (JP)

( * ) Notice: Subject to any disclaimer, the term of this patent is extended or adjusted under 35 U.S.C. 154(b) by 0 days.

(21) Appl. No.: 16/134,549

(22) Filed: Sep. 18, 2018

(65) Prior Publication Data

US 2019/0092572 A1    Mar. 28, 2019

(30) Foreign Application Priority Data

Sep. 25, 2017 (JP) ................... 2017-184100

(51) Int. Cl.
*B65G 23/23* (2006.01)
*B65G 35/06* (2006.01)
*B65G 54/02* (2006.01)

(52) U.S. Cl.
CPC ............. *B65G 23/23* (2013.01); *B65G 35/06* (2013.01); *B65G 54/02* (2013.01)

(58) Field of Classification Search
CPC ......... B65G 35/06; B65G 23/23; B65G 54/02
See application file for complete search history.

(56) References Cited

U.S. PATENT DOCUMENTS

| 2013/0229134 A1* | 9/2013 | Sato | ................. H02K 41/031 318/135 |
| 2014/0257554 A1* | 9/2014 | Takagi | ................. H02P 25/06 700/229 |
| 2015/0303841 A1* | 10/2015 | Suzuki | ................. H02P 6/006 318/38 |
| 2016/0194157 A1* | 7/2016 | Senn | ................. B65G 35/06 414/467 |

(Continued)

FOREIGN PATENT DOCUMENTS

JP        H7-63201        7/1995

OTHER PUBLICATIONS

U.S. Appl. No. 15/979,341, filed May 14, 2018.
U.S. Appl. No. 16/134,563, filed Sep. 18, 2018.
U.S. Appl. No. 16/129,013, filed Sep. 12, 2018.

*Primary Examiner* — Mark A Deuble
(74) *Attorney, Agent, or Firm* — Venable LLP

(57) ABSTRACT

A conveyance system includes a plurality of coils arranged so as to form a row at a predetermined pitch, a carriage configured to move along the row through use of an electromagnetic force received from the plurality of coils as a driving force, a plurality of drivers configured to cause an electric current to flow through coils to be controlled among the plurality of coils to provide the driving force to the carriage, and a controller configured to switch the coils to be controlled, which are assigned to each of the plurality of drivers, among the plurality of coils. As the coils to be controlled, which are assigned to each of the plurality of drivers, among the plurality of coils, coils for each predetermined interval of at least two pitches based on a distance between carriages determined in advance are assigned to each of the plurality of drivers.

13 Claims, 11 Drawing Sheets

(56) References Cited

U.S. PATENT DOCUMENTS

| | | | |
|---|---|---|---|
| 2016/0355350 A1 | 12/2016 | Yamamoto | B60L 13/03 |
| 2017/0008709 A1 | 1/2017 | Tomoda et al. | H02K 41/03 |
| 2017/0117829 A1* | 4/2017 | Yamamoto | H02P 6/006 |
| 2019/0062066 A1* | 2/2019 | Tsai | B65G 43/00 |

* cited by examiner

CONVEYANCE APPARATUS, CONVEYANCE SYSTEM, AND METHOD OF CONTROLLING CONVEYANCE SYSTEM

BACKGROUND OF THE INVENTION

Field of the Invention

The present invention relates to a conveyance apparatus, a conveyance system, and a method of controlling the conveyance system.

Description of the Related Art

In production lines for assembling industrial products, there has been used a conveyance system configured to convey workpieces such as components within a factory automated production line or between a plurality of stations between production lines. As such conveyance system, a conveyance system configured to move a carriage through use of a movable magnet linear motor has been proposed.

In Japanese Patent Publication No. H07-063201, there is described a power supply device of a linear motor, which includes a plurality of linear motor units each formed of a plurality of propulsion coils connected in series, and is configured to cause a movable body to travel.

In the linear motor described in Japanese Patent Publication No. H07-063201, a plurality of propulsion coils forming a first linear motor unit are arranged at an interval, and propulsion coils forming a second linear motor unit are respectively arranged between the plurality of propulsion coils. With this configuration, even when a part of power converters and the like fails to operate properly, the movable body can be caused to travel with a continuous thrust force.

In the linear motor, when the positional relationship between a coil being a stator and a magnet being a movable element changes, a counter-electromotive force is generated in the coil in accordance with the traveling speed of the movable body having the magnet mounted thereon. When the counter-electromotive force is generated in the coil, the terminal voltage of the coil is decreased, and a predetermined electric current cannot be caused to flow, with the result that a desired thrust force is not obtained. Therefore, in particular, when the movable body is intended to be moved at a high speed, it is important to consider how to reduce the influence of the counter-electromotive force generated in the coil. Further, in a conveyance system to be used in a production line for assembling industrial products, it is also assumed that a plurality of carriages are present on a conveyance path, and the carriages are arranged closely to each other. Therefore, it is required to control the carriages independently also when the carriages are arranged closely to each other.

However, in Japanese Patent Publication No. H07-063201, the influence of the counter-electromotive force generated in the coil and the case in which a plurality of movable bodies are present on the conveyance path have not be particularly taken into consideration.

SUMMARY OF THE INVENTION

An object of the present invention is to provide a conveyance apparatus, a conveyance system, and a method controlling the conveyance system, which are capable of appropriately controlling the movement of carriages in accordance with a distance between the carriages and a counter-electromotive force generated in a coil.

According to one aspect of the present invention, there is provided a conveyance system including a plurality of coils arranged so as to form a row at a predetermined pitch, carriage configured to move along the row of the plurality of coils through use of an electromagnetic force received from the plurality of coils as a driving force, plurality of drivers configured to cause an electric current to flow through coils to be controlled among the plurality of coils to provide the driving force to the carriage, and a controller configured to switch the coils to be controlled, which are assigned to each of the plurality of drivers, among the plurality of coils, wherein, as the coils to be controlled, which are assigned to each of the plurality of drivers, among the plurality of coils, coils for each predetermined interval of at least two pitches based on a distance between carriages determined in advance are assigned to each of the plurality of drivers.

According to another aspect of the present invention, there is provided a conveyance apparatus including a plurality of coils, which are arranged so as to form a row at a predetermined pitch, and configured to move a carriage along the row through use of an electromagnetic force to be generated, a plurality of drivers configured to cause an electric current to flow through coils to be controlled among the plurality of coils to provide a driving force to the carriage, and a controller configured to switch the coils to be controlled, which are assigned to each of the plurality of drivers, among the plurality of coils, wherein, as the coils to be controlled, which are assigned to each of the plurality of drivers, among the plurality of coils, coils for each predetermined interval of at least two pitches based on a distance between carriages determined in advance are assigned to each of the plurality of drivers.

According to further another aspect of the present invention, there is provided a method of controlling a conveyance system including a plurality of coils, which are arranged so as to form a row at a predetermined pitch, and configured to move a carriage along the row through use of an electromagnetic force to be generated, a plurality of drivers configured to cause an electric current to flow through coils to be controlled among the plurality of coils to provide a driving force to the carriage, and a controller configured to switch the coils to be controlled, which are assigned to each of the plurality of drivers, among the plurality of coils, the method including conveying a workpiece by the carriage, and performing processing with respect to the workpiece conveyed by the carriage, wherein, as the coils to be controlled, which are assigned to each of the plurality of drivers, among the plurality of coils, coils for each predetermined interval of at least two pitches based on a distance between carriages determined in advance are assigned to each of the plurality of drivers.

Further features of the present invention will become apparent from the following description of exemplary embodiments with reference to the attached drawings.

DESCRIPTION OF THE EMBODIMENTS

Preferred embodiments of the present invention will now be described in detail in accordance with the accompanying drawings.

First Embodiment

A conveyance system and a processing system in a first embodiment of the present invention are described with reference to FIG. 1 to FIG. 9D.

Figure 1:
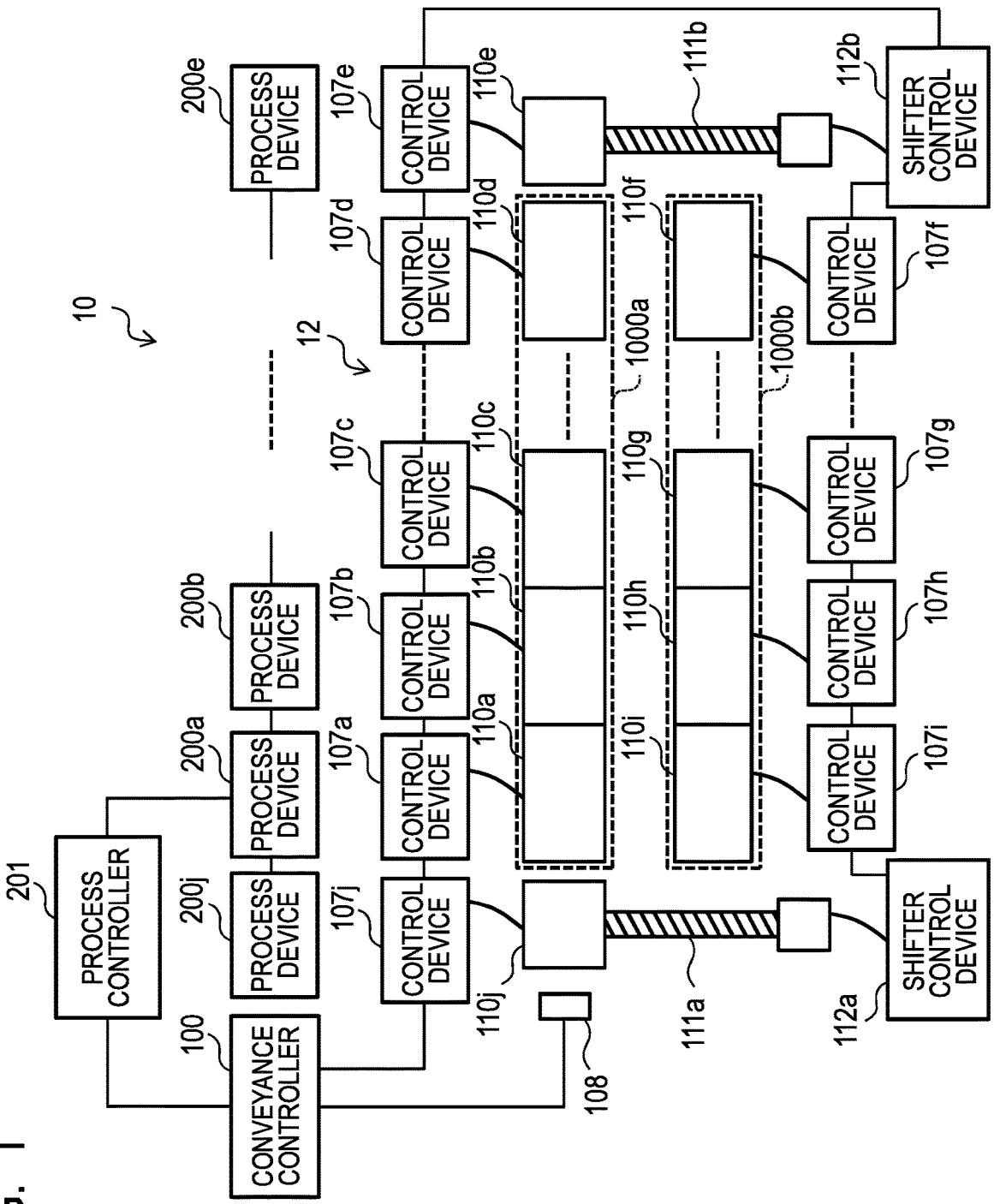
FIG. 1 is a block diagram for illustrating a schematic configuration of a processing system in a first embodiment of the present invention.

First, a schematic configuration of the processing system in the first embodiment is described with reference to FIG. 1. FIG. 1 is a block diagram for illustrating a configuration of the processing system in the first embodiment. In the following description and drawings, a plurality of the same components are discriminated from each other by adding, as identifiers, lower-case alphabet letters to the ends of the same reference symbols. When it is not required to give description particularly under a state in which the same components are discriminated from each other, only the reference symbol is used without the identifier.

As illustrated in FIG. 1, a processing system 10 in the first embodiment includes a plurality of process devices 200, a conveyance system 12, and a process controller 201. The conveyance system 12 includes a plurality of conveyance modules 110, a plurality of control devices 107, shift units 111a and 111b, shift unit control devices 112a and 112b, a reader/writer 108, and a conveyance controller 100. In FIG. 1, as the plurality of process devices 200, process devices 200a to 200e and 200j are illustrated. Further, as the plurality of conveyance modules 110, conveyance modules 110a to 110j are illustrated. Further, as the plurality of control devices 107, control devices 107a to 107j are illustrated.

The conveyance modules 110a to 110d form a conveyance path 1000a. The conveyance modules 110f to 110i form a conveyance path 1000b. The conveyance paths 1000a and 1000b are each a passage on which a carriage conveying a workpiece travels. The conveyance path 1000a is a conveyance path forming a going path, and the conveyance path 1000b is a conveyance path forming a return path. The conveyance paths 1000a and 1000b are arranged in parallel to each other.

In FIG. 1, a left end of the conveyance path 1000a is, for example, an upstream end, and a right end of the conveyance path 1000a is, for example, a downstream end. Further, a right end of the conveyance path 1000b is, for example, an upstream end, and a left end of the conveyance path 1000b is, for example, a downstream end. On a side of the upstream end of the conveyance path 1000a and the downstream end of the conveyance path 1000b which are positioned on the same side (left side in FIG. 1), the shift unit 111a configured to transfer the carriage from the conveyance path 1000b to the conveyance path 1000a is installed. The conveyance module 110j that is moved so as to be connected to both of the conveyance path 1000a and the conveyance path 1000b is provided to the shift unit 111a. Further, on a side of the downstream end of the conveyance path 1000a and the upstream end of the conveyance path 1000b which are positioned on the same side (right side in FIG. 1), the shift unit 111b configured to transfer the carriage from the conveyance path 1000a to the conveyance path 1000b is installed. The conveyance module 110e that is moved so as to be connected to both of the conveyance path 1000a and the conveyance path 1000b is provided to the shift unit 111b. The conveyance modules 110j and 110e are the same as the other conveyance modules 110 forming the conveyance path 1000 except that the conveyance modules 110j and 110e are mounted on the shift units 111a and 111b, respectively. There is no particular limitation on the shift unit 111, and for example, a linear actuator obtained by combining a rotary motor, a ball screw, and a linear guide can be employed.

The control devices 107a to 107j are provided so as to correspond to the conveyance modules 110a to 110j, respectively. In FIG. 1, the plurality of control devices 107a, 107b, 107c, . . . , 107d are provided so as to correspond to the plurality of conveyance modules 110a, 110b, 110c, . . . , 110d forming the conveyance path 1000a. Further, the plurality of control devices 107f, . . . , 107g, 107h, and 107i are provided so as to correspond to the plurality of conveyance modules 110f, . . . , 110g, 110h, and 110i forming the conveyance path 1000b. Further, the control devices 107j and 107e are provided so as to correspond to the conveyance modules 110j and 110e on the shift units 111a and 111b, respectively.

The control devices 107a to 107j are connected to the conveyance controller 100 that is a higher-order control unit, and information regarding conveyance of the carriage can be transmitted and received between the control devices 107a to 107j and the conveyance controller 100. The conveyance controller 100 serves as a lower-order control device configured to control conveyance of the carriage by the corresponding conveyance module 110. With this, the carriage can freely travel on the conveyance path 1000 formed of the plurality of conveyance modules 110.

The shift unit 111 is connected to the shift unit control device 112. The shift unit control device 112 can move the conveyance module 110 mounted on the shift unit 111 by driving the shift unit 111 through predetermined control.

The shift unit control devices 112a and 112b are connected to the conveyance controller 100 that is a higher-order control unit, and information regarding conveyance of the carriage can be transmitted and received between the shift unit control devices 112a and 112b and the conveyance controller 100. With this, the carriage can be moved between the conveyance path 1000a and the conveyance path 1000b through control of the shift units 111a and 111b.

The plurality of process devices 200a to 200e and 200j are provided so as to correspond to the plurality of conveyance modules 110a to 110e and 110j, respectively. The process device 200 is a processing device configured to perform predetermined processing to the workpiece held by the carriage that is stopped on the corresponding conveyance module 110. The number of the conveyance modules 110 is not necessarily required to be the same as that of the process devices 200. For example, the plurality of process devices 200 may be provided with respect to one conveyance module 110.

The above-mentioned processing may involve deformation of the workpiece or may involve merely changing the movement and direction of the workpiece. Further, the above-mentioned processing may involve incorporating the workpiece into another workpiece or component, or may involve inspecting the shape and weight of the workpiece, inspecting the presence or absence of a scratch and dust, and inspecting the places of the scratch and dust.

The process controller 201 is connected to the plurality of process devices 200a to 200e and 200j and the conveyance controller 100. The process controller 201 can transmit and receive information regarding the process with respect to the plurality of process devices 200a to 200e and 200j. With this, the process devices 200a to 200e and 200j perform processing designated by the process controller 201. Further, the process controller 201 can transmit and receive information regarding conveyance of the carriage with respect to the conveyance controller 100. With this, the conveyance controller 100 controls conveyance of the carriage based on an instruction from the process controller 201. With this, the process controller 201 can control the entire operation of the processing system 10, such as the conveyance of the workpiece by the carriage and the processing of the workpiece.

Figure 2:
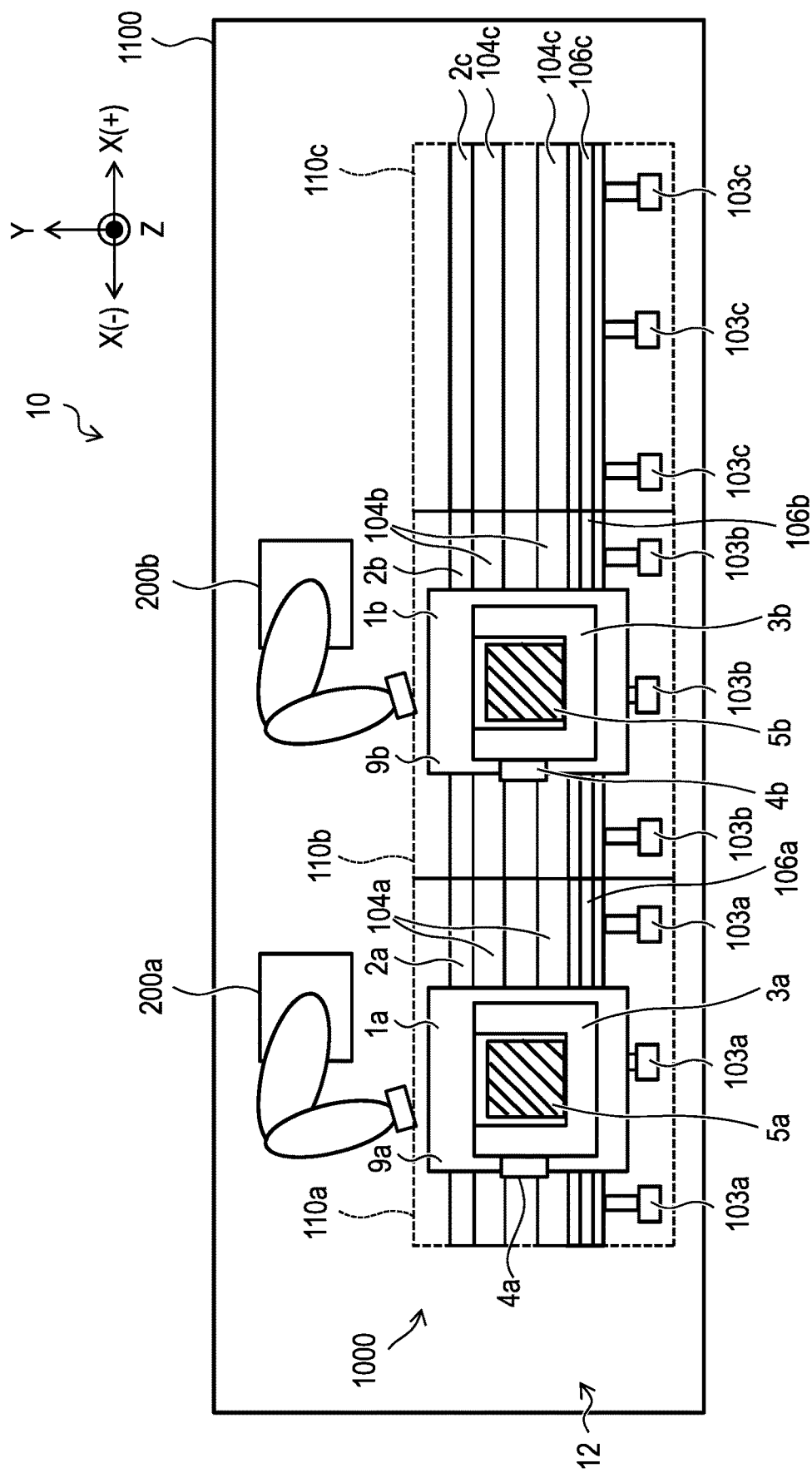
FIG. 2 is a top view for illustrating the schematic configuration of the processing system in the first embodiment of the present invention.
Figure 3:
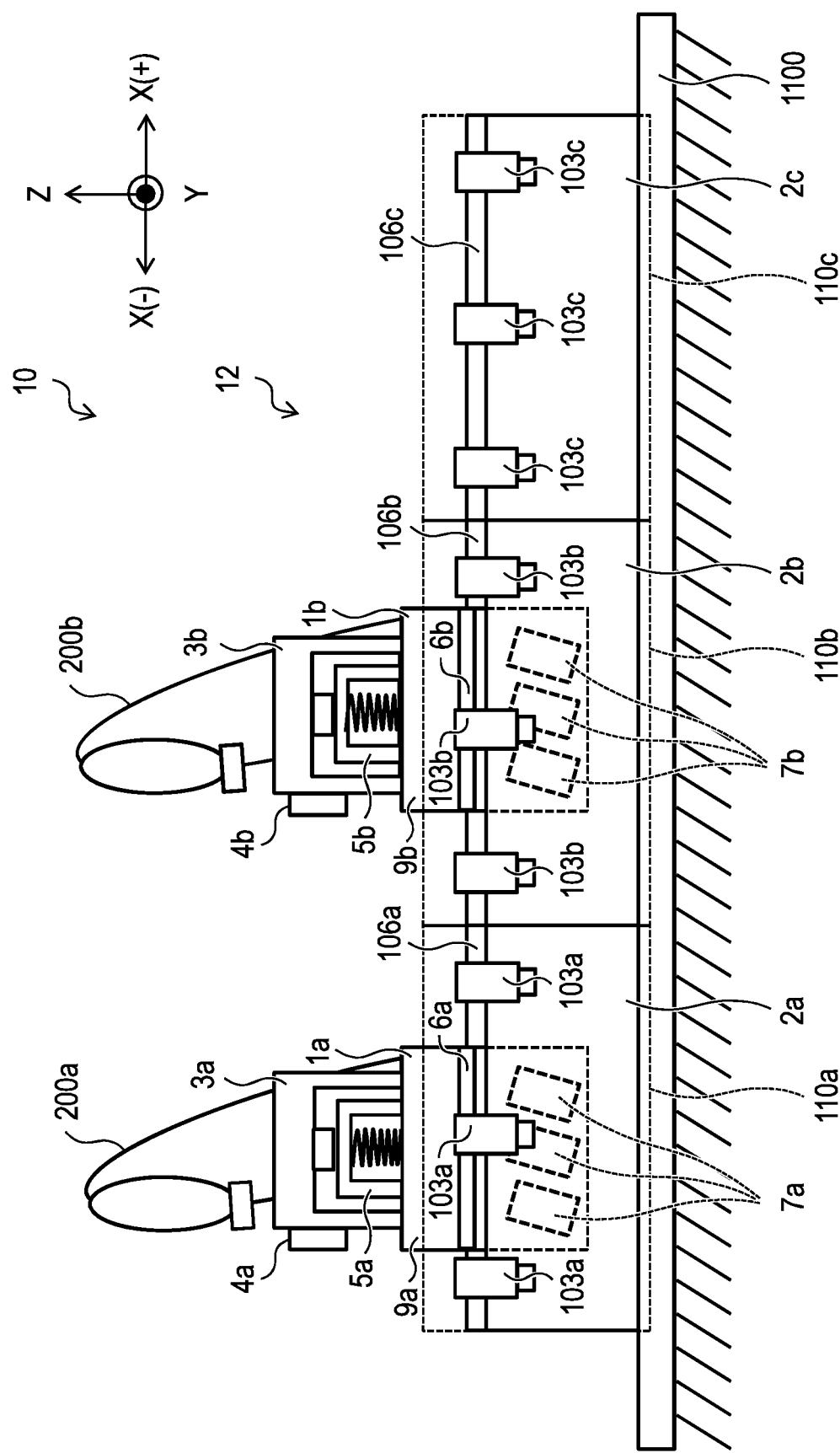
FIG. 3 is a side view for illustrating the schematic configuration of the processing system in the first embodiment of the present invention.
Figure 4:
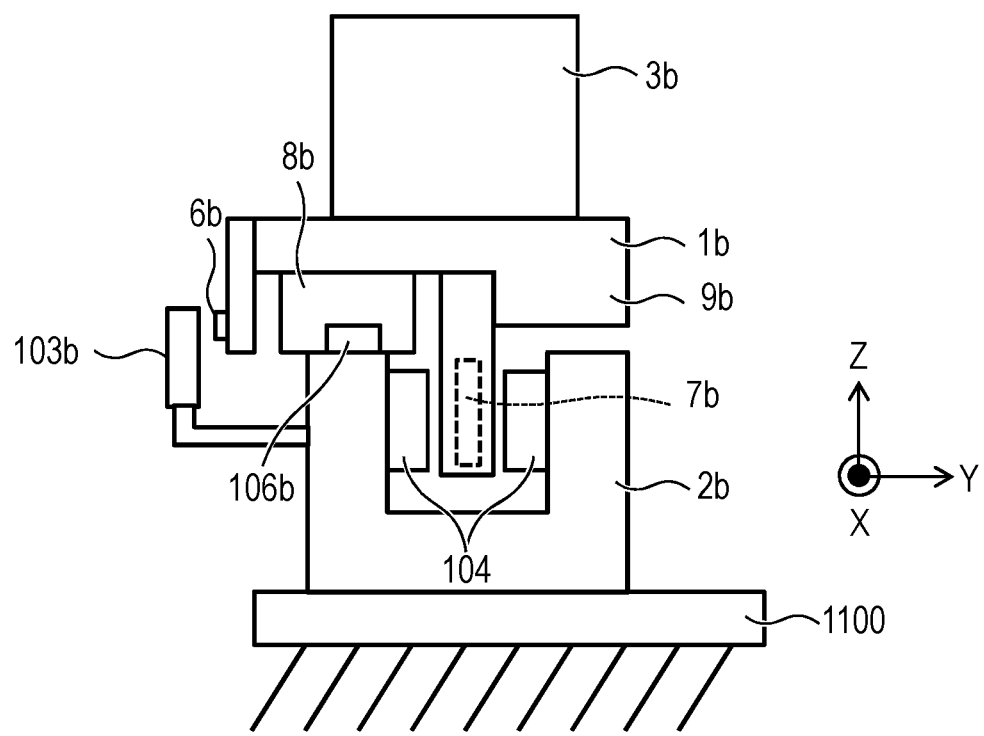
FIG. 4 is a front view for illustrating the schematic configuration of the processing system in the first embodiment of the present invention.

Next, a specific structure of the processing system 10 in the first embodiment is described with reference to FIG. 2 to FIG. 4. FIG. 2 to FIG. 4 are each a schematic view for illustrating a configuration of the processing system in the first embodiment. FIG. 2, FIG. 3, and FIG. 4 are a top view, a side view, and a front view of the processing system in the first embodiment, respectively.

As illustrated in FIG. 2 to FIG. 4, the processing system 10 in the first embodiment includes a rack 1100, the plurality of process devices 200, and the conveyance system 12. In FIG. 2 and FIG. 3, among the plurality of process devices 200, only the process devices 200a and 200b are illustrated. In FIG. 4, of the plurality of process devices 200, only the process device 200b is illustrated.

The conveyance system 12 includes the plurality of conveyance modules 110 and a plurality of carriages 1. In FIG. 1 and FIG. 2, among the plurality of conveyance modules 110, only the conveyance modules 110a and 110b are illustrated. In FIG. 4, among the plurality of conveyance modules 110, only the conveyance module 110b is illustrated.

The plurality of conveyance modules 110 form the conveyance path 1000 on which the carriages 1 configured to convey workpieces 5 to be processed travel. In FIG. 2 and FIG. 3, the conveyance path 1000 formed of the conveyance modules 110a, 110b, and 110c is illustrated. In FIG. 2 to FIG. 4, there is illustrated a state in which a carriage 1a configured to convey a workpiece 5a and a carriage 1b configured to convey a workpiece 5b are arranged on the conveyance path 1000. In FIG. 2 to FIG. 4, the two carriages 1a and 1b are illustrated. However, the number of the carriages 1 is not limited to two, and one carriage or a plurality of carriages may be used.

Now, for convenience of the following description, a coordinate axis in the processing system 10 is defined. First, an X-axis is taken along the moving direction of the carriage 1 that moves horizontally. A Z-axis is taken along a vertical direction. A Y-axis is taken along a direction orthogonal to the X-axis and the Z-axis. Further, of X-directions along the X-axis, the moving direction of the carriages 1, specifically, the direction in which the carriage 1a illustrated in FIG. 1 moves toward the carriage 1b is defined as a positive (+) direction, and a direction opposite thereto is defined as a negative (−) direction.

The conveyance system 12 is a conveyance system configured to convey the workpiece 5 by causing the carriage 1 to travel with a movable magnet linear motor (moving magnet linear motor, movable field linear motor). The conveyance modules 110 are arranged on the rack 1100. When the plurality of conveyance modules 110 are arranged on the rack 1100, the continuous conveyance path 1000 is formed. In FIG. 2 and FIG. 3, the three conveyance modules 110a, 110b, and 110c are illustrated. However, the number of the conveyance modules 110 is not limited to three, and one conveyance module or a plurality of conveyance modules may be used. In FIG. 1 to FIG. 3, an example in which the linear passage forms the conveyance path 1000 is illustrated. However, the conveyance path 1000 is not necessarily required to be a linear passage, and passages having any form (for example, an oblong shape or a circular shape) can be adopted.

Each of the conveyance modules 110 further includes a housing 2, position detecting units 103, a coil array 104, and a guide 106. The housing 2 is installed so as to be fixed onto the rack 1100. The position detecting units 103, the coil array 104, and the guide 106 are mounted on the housing 2. The control device 107 is connected to the position detecting units 103 and the coil array 104.

The position detecting unit 103 is, for example, an encoder and is configured to acquire position information of the carriage 1 by reading a scale 6 of the carriage 1 described later. The position detecting unit 103 is configured to transmit the acquired position information of the carriage 1 to the control device 107.

The coil array 104 has a configuration in which a plurality of unit coils formed of a plurality of coils each having an electric wire wound around a magnetic iron core are arranged. The coil array 104 is arranged on an inner side of the housing 2 along the moving direction of the carriage 1. The detail of the coil array 104 is described later.

The coil array 104 is supplied with a predetermined electric current under the control of the control device 107. When an electric current is applied to the coil array 104, magnets 7 of the carriage 1 receive an electromagnetic force as a driving force from the coil array 104. Thus, the carriage 1 receives a propulsion force (driving force) to travel on the conveyance path 1000. Through control of an electric current flowing through the coil array 104, the carriage 1 is caused to travel or stop, and thus the position of the carriage 1 on the corresponding conveyance module 110 can be controlled.

The guide 106 is configured to movably support the carriage 1 thereon. When the carriage 1 is arranged on the guide 106, the carriage 1 can be moved along the guide 106.

The carriage 1 includes a gripping unit 3, the scale 6, a bearing 8, the magnets 7, a radio frequency (RF) tag 4, and a top plate 9.

The gripping unit 3 is mounted on an upper portion of the top plate 9. The gripping unit 3 is configured to grip the workpiece 5 on the top plate 9. In the conveyance system 12 according to the first embodiment, the workpieces 5 of a plurality of different kinds are conveyed by the carriages 1. As the gripping units 3, gripping units of a plurality of different kinds can be used depending on the kinds of the workpieces 5 to be gripped.

The scale 6 is provided to a side portion of the top plate 9. Position information is recorded on the scale 6 along the moving direction of the carriage 1. The position detecting units 103 can acquire the position information of the carriage 1 by reading the scale 6 of the carriage 1. The scale 6 is mounted at a predetermined position of the side portion of the top plate 9 so as to be opposed to the position detecting units 103. The plurality of position detecting units 103 are mounted on the conveyance module 110 at an interval smaller than a scale length of the scale 6 so that any one of the position detecting units 103 can read the scale 6.

The bearing 8 is provided to a lower portion of the top plate 9. The bearing 8 is mounted on the guide 106 provided to the conveyance module 110 so as to rotate and travel along the guide 106. When the bearing 8 is mounted on the guide 106, the carriage 1 is movably supported along the guide 106.

The plurality of magnets 7 are provided in a lower portion of the top plate 9. The plurality of magnets 7 are arrayed along the moving direction of the carriage 1. As illustrated in FIG. 4, the plurality of magnets 7 are provided between the coil array 104 arranged in the conveyance module 110 and are arranged so that different poles appear alternately along the arrangement of the coil array 104.

The RF tag 4 is mounted on a side surface of the gripping unit 3. The RF tag 4 is a storage unit configured to store identification (ID) information that is identification information unique to the carriage 1 for identifying the carriage 1.

The reader/writer 108 is a reading unit configured to read information from the RF tag 4. The reader/writer 108 is provided in order to read the ID information stored in the RF tag 4 mounted on the carriage 1 in a non-contact manner. The reader/writer 108 is communicably connected to the conveyance controller 100 and is configured to transmit the ID information read from the RF tag 4 to the conveyance controller 100.

As described above, the conveyance controller 100 is connected to the reader/writer 108. The conveyance controller 100 serves also as an identifying unit configured to identify the carriage 1 and can identify the carriage 1 based on the ID information transmitted from the reader/writer 108 that has read the RF tag 4 mounted on the carriage 1.

The process device 200 is a device configured to perform predetermined processing with respect to the workpiece 5 conveyed by the carriage 1. The process device 200 is configured to perform designated processing to the workpiece 5 under a state in which the workpiece 5 is gripped by the gripping unit 3 on the carriage 1 at a position where the carriage 1 is stopped. When the predetermined processing is performed with respect to the workpiece 5 in each of the process devices 200, an article such as an electronic device can be manufactured.

The processing to be performed by the process device 200 involves various kinds. For example, the process device 200 is configured to perform processing involving incorporating another component to the workpiece 5, applying an adhesive to the workpiece 5, removing a component or the like from the workpiece 5, inspecting the workpiece 5, and irradiating the workpiece 5 with a light beam.

In FIG. 1, the process devices 200a to 200e and 200j are illustrated, and in FIG. 2 and FIG. 3, the process devices 200a and 200b are illustrated. However, there is no particular limitation on the number of the process devices 200. Various layouts of the process devices 200 are conceivable depending on each production line, and the kind and number of the process devices 200 can be selected in accordance with the layout.

A basic operation of the processing system 10 in the first embodiment is described with reference to FIG. 1 to FIG. 4.

In this case, it is assumed that the conveyance module 110j is positioned at a place adjacent to the conveyance module 110a through use of the shift unit 111a and connected to the conveyance path 1000a. It is assumed that the empty carriage 1 having no workpiece 5 mounted thereon is stopped on the conveyance module 110j.

The process controller 201 controls the conveyance controller 100 and the process device 200 to control the entire operation of the processing system 10 including supply, conveyance, processing, and delivery of the workpiece 5.

The process device 200j supplies the workpiece 5 to be processed to the carriage 1 stopped on the conveyance module 110j in accordance with an instruction from the process controller 201. The carriage 1 grips the workpiece 5 supplied from the process device 200j with the gripping unit 3.

Then, the control devices 107j and 107a move the carriage 1 stopped on the conveyance module 110j in a direction of the conveyance path 1000a and stops the carriage 1 on the conveyance module 110a in accordance with an instruction from the conveyance controller 100. The process device 200a performs predetermined processing to the workpiece 5 gripped by the carriage 1 stopped on the conveyance module 110a in accordance with an instruction from the process controller 201.

Similarly, the conveyance modules 110a, 110b, 110c, . . . , 110d successively convey the carriage 1 to the conveyance modules 110a, 110b, 110c, . . . , 110d in accordance with an instruction from the conveyance controller 100. Then, the process devices 200a, 200b, 200c, . . . , 200d successively perform predetermined processing to the workpiece 5 gripped by the carriage 1 in accordance with an instruction from the process controller 201.

The shift unit control device 112b drives the shift unit 111b to move the conveyance module 110e in the direction of the conveyance path 1000a in accordance with an instruction from the conveyance controller 100. Then, the shift unit control device 112b stops the conveyance module 110e at a position adjacent to the conveyance module 110d so that the carriage 1 stopped on the conveyance module 110d can move onto the conveyance module 110e.

Under a state in which the conveyance module 110d and the conveyance module 110e are adjacent to each other, the control devices 107d and 107e move the carriage 1 stopped on the conveyance module 110d toward the conveyance module 110e in accordance with an instruction from the conveyance controller 100. Further, the control device 107e stops the carriage 1 on the conveyance module 110e. The process device 200e delivers the workpiece 5 subjected to the processing by the process devices 200a to 200d from the carriage 1 stopped on the conveyance module 110e in accordance with an instruction from the process controller 201.

Under a state in which the empty carriage 1 having delivered the workpiece 5 is stopped on the conveyance module 110e, the shift unit control device 112b drives the shift unit 111b to move the conveyance module 110e in a direction of the conveyance path 1000b in accordance with an instruction from the conveyance controller 100. Then, the shift unit control device 112b stops the conveyance module 110e at a position adjacent to the conveyance module 110f so that the carriage 1 stopped on the conveyance module 110e can move onto the conveyance module 110f.

Under a state in which the conveyance module 110f and the conveyance module 110e are adjacent to each other, the control devices 107e and 107f move the carriage 1 stopped on the conveyance module 110e toward the conveyance module 110f in accordance with an instruction from the conveyance controller 100. Further, the control device 107f moves the carriage 1 on the conveyance module 110f. With this, the carriage 1 can be moved from the conveyance path 1000a to the conveyance path 1000b through the conveyance module 110e on the shift unit 111b.

The control devices 107f, . . . , 107g, 107h, and 107i successively convey the carriage 1 on the conveyance module 110f from the conveyance module 110f to the conveyance module 110i in accordance with an instruction from the conveyance controller 100.

Further, the shift unit control device 112a drives the shift unit 111a to move the conveyance module 110j in the direction of the conveyance path 1000b in accordance with an instruction from the conveyance controller 100. Then, the shift unit control device 112a stops the conveyance module 110j at a position adjacent to the conveyance module 110i so that the carriage 1 stopped on the conveyance module 110i can move onto the conveyance module 110j.

Under a state in which the conveyance module 110i and the conveyance module 110j are adjacent to each other, the control devices 107i and 107j move the carriage 1 stopped on the conveyance module 110i toward the conveyance module 110j in accordance with an instruction from the conveyance controller 100. Further, the control device 107j stops the carriage 1 on the conveyance module 110j.

Under a state in which the empty carriage 1 is stopped on the conveyance module 110j, the shift unit control device 112a drives the shift unit 111a to move the conveyance module 110j in the direction of the conveyance path 1000a in accordance with an instruction from the conveyance controller 100. Then, the shift unit control device 112a stops the conveyance module 110j at a position adjacent to the conveyance module 110a so that the carriage 1 stopped on the conveyance module 110j can move onto the conveyance module 110a.

As described above, the carriage 1 having travelled on the passage including the conveyance path 1000a and the conveyance path 1000b is returned onto the conveyance module 110j stopped at a place adjacent to the conveyance module 110a under an empty state in which the workpiece 5 is not mounted on the carriage 1.

Figure 5:
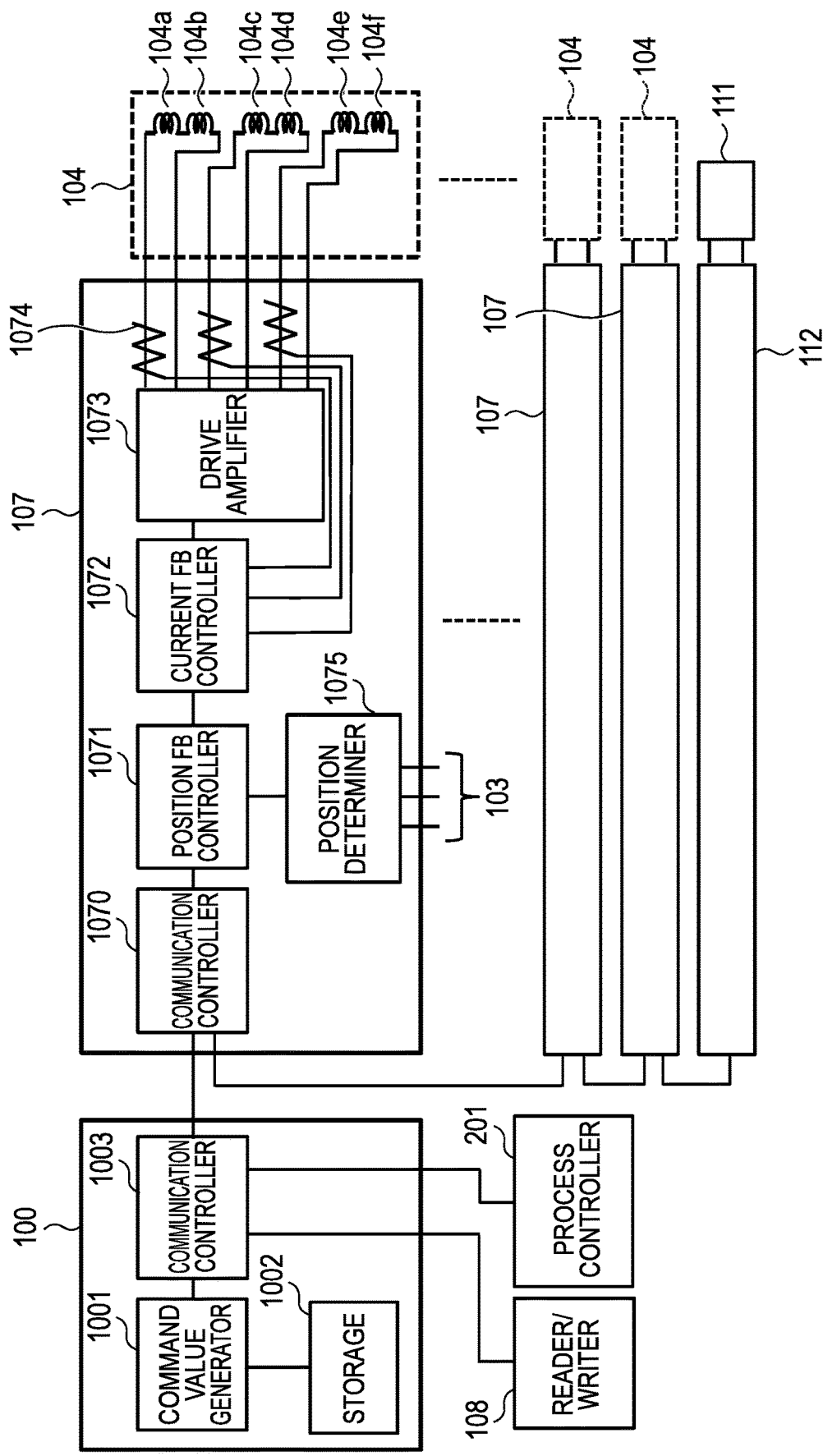
FIG. 5 is a block diagram for illustrating a control configuration of a conveyance system according to the first embodiment of the present invention.

Next, the control configuration of the conveyance system 12 according to the first embodiment is described with reference to FIG. 5. FIG. 5 is a block diagram for illustrating the control configuration of the conveyance system 12 according to the first embodiment.

The conveyance controller 100 serves as a higher-order control unit configured to control conveyance of the plurality of carriages 1 with respect to the control device 107 that serves as a lower-order control unit. The conveyance controller 100 includes a command value generating unit 1001, a storage unit 1002, and a communication control unit 1003. The conveyance controller 100 may have other functions, but description of the other functions is omitted in the first embodiment.

The communication control unit 1003 is configured to control communication between the conveyance controller 100 and the plurality of control devices 107, the plurality of shift unit control devices 112, the process controller 201, and the reader/writer 108 connected to the conveyance controller 100. Specifically, the communication control unit 1003 is configured to perform transmission and reception of various control signals and control data between the conveyance controller 100 and the control devices 107, the shift unit control devices 112, the process controller 201, and the reader/writer 108 at predetermined timing.

The storage unit 1002 is configured to store a stop reference position serving as a reference for stopping each of the carriages 1 on the conveyance path 1000. The stop reference position is set in advance, for example, as a position where the carriage 1 is to be stopped when the process device 200 performs predetermined processing with respect to the workpiece 5 on the carriage 1. Further, the storage unit 1002 is configured to store movement error data that is data regarding a movement error of the carriage 1 acquired in accordance with each stop reference position and the kind of the workpiece 5 or the kind of the gripping unit 3 having a correlation with the workpiece 5.

The command value generating unit 1001 is configured to generate a position command value of the carriage 1 to be controlled. The position command value is a value representing a target stop position of the carriage 1. The command value generating unit 1001 is configured to calculate a value representing a target stop position through use of a stop reference position and a movement error as a position command value with respect to each of the carriages 1. ID information of the carriage 1 read by the reader/writer 108 is input to the command value generating unit 1001 through the communication control unit 1003. The command value generating unit 1001 serves also as an identifying unit configured to identify the carriage 1. For example, the command value generating unit 1001 can identify the carriage 1 stopped on the conveyance module 110j positioned adjacently to the conveyance module 110a based on the input ID information.

The control device 107 is a drive unit configured to drive the coil array 104. The control device 107 includes a position feedback (FB) control unit 1071, a position determination unit 1075, a current FB control unit 1072, a drive amplifier unit 1073, a current detecting unit 1074, and a communication control unit 1070. The drive amplifier unit 1073 is connected to the coil array 104 of the conveyance module 110.

The drive amplifier unit 1073 has a plurality of output terminals. In FIG. 5, the drive amplifier unit 1073 having three output terminals is illustrated, but there is no particular limitation on the number of output terminals of the drive amplifier unit 1073. A series coil including a plurality of coils connected in series is connected to each of the output terminals of the drive amplifier unit 1073. In FIG. 5, a series coil including two coils connected in series is illustrated, but there is no particular limitation on the number of coils forming the series coil. Of the three output terminals of the drive amplifier unit 1073 illustrated in FIG. 5, a first output terminal is connected to a series coil including a coil 104a and a coil 104b connected in series. A second output terminal of the drive amplifier unit 1073 is connected to a series coil including a coil 104c and a coil 104d connected in series. A third output terminal of the drive amplifier unit 1073 is connected to a series coil including a coil 104e and a coil 104f connected in series.

In the plurality of coils (coils 104a to 104f) forming the coil array 104, the coils forming each series coil are arranged one by one successively along the moving direction of the carriage 1. For example, when the coil array 104 is formed of the six coils 104a to 104f illustrated in FIG. 5, the coil 104a, the coil 104c, the coil 104e, the coil 104b, the coil 104d, and the coil 104f are arranged in a row in the stated order along the moving direction of the carriage 1. The three series coils may be driven with a three-phase alternating current including a U-phase, a V-phase, and a W-phase.

In other words, the coil array 104 is arranged so as to form rows at a predetermined pitch (unit pitch). The coil array 104 includes a plurality of series coils each including a predetermined number of coils connected in series. The predetermined number of coils forming each of the plurality of series coils are arranged at a predetermined interval of at least two units each having the unit pitch as one unit.

The current detecting unit 1074 is configured to measure an electric current flowing through each of the series coils of the coil array 104 and input the measured current value to the current FB control unit 1072.

The position determination unit 1075 is configured to identify the position of the carriage 1 on the conveyance module 110. Specifically, the position determination unit 1075 receives a signal representing position information from the position detecting unit 103 mounted on the conveyance module 110. The position determination unit 1075 is configured to identify the position of the carriage 1 on the conveyance module 110 based on the signal input from the position detecting unit 103.

The communication control unit 1070 is connected to the conveyance controller 100 and is configured to perform transmission and reception of various control signals and control data between the communication control unit 1070 and the conveyance controller 100 at predetermined timing. The communication control unit 1070 of each of the control devices 107 may be connected to the conveyance controller 100 through intermediation of the communication control unit 1070 of another control device 107 (see FIG. 5) or may be directly connected to the conveyance controller 100.

The position FB control unit 1071 compares the position information of the carriage 1 identified by the position determination unit 1075 to the position information based on the position command value generated by the command value generating unit 1001. The position FB control unit 1071 outputs the comparison results to the current FB control unit 1072 as control information.

The current FB control unit 1072 compares the control information input from the position FB control unit 1071 to the current value detected by the current detecting unit 1074. The current FB control unit 1072 generates a command value of an electric current output to the drive amplifier unit 1073 in accordance with the comparison result to output the command value to the drive amplifier unit 1073.

The drive amplifier unit 1073 controls an electric current flowing through each series coil of the coil array 104 to which the drive amplifier unit 1073 is connected, based on the command value input from the current FB control unit 1072. Through the above-mentioned current feedback control, the responsiveness of the carriage 1 can be improved.

The shift unit control device 112 is connected to the shift unit 111 and is configured to perform operation control of the shift unit 111. The shift unit control device 112 is configured to control the shift unit 111 with a configuration equivalent to that of the control device 107. The shift unit control device 112 is configured to perform appropriate operation control of the shift unit 111 to which the shift unit control device 112 is connected, based on the control signal from the conveyance controller 100. The shift unit control device 112 may be connected to the conveyance controller 100 through intermediation of the communication control unit 1070 of the control device 107 (see FIG. 5) or may be directly connected to the conveyance controller 100.

Figure 6:
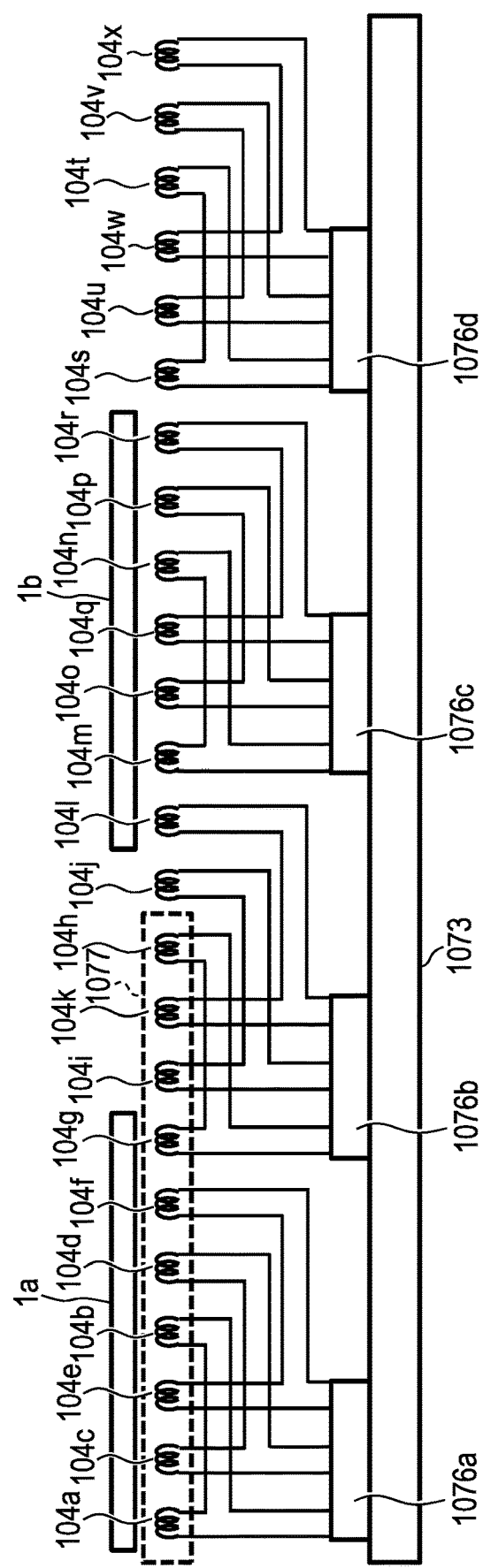
FIG. 6, FIG. 7, and FIG. 8 are each a diagram for illustrating an arrangement example of coils in the conveyance system according to the first embodiment of the present invention.
Figure 7:
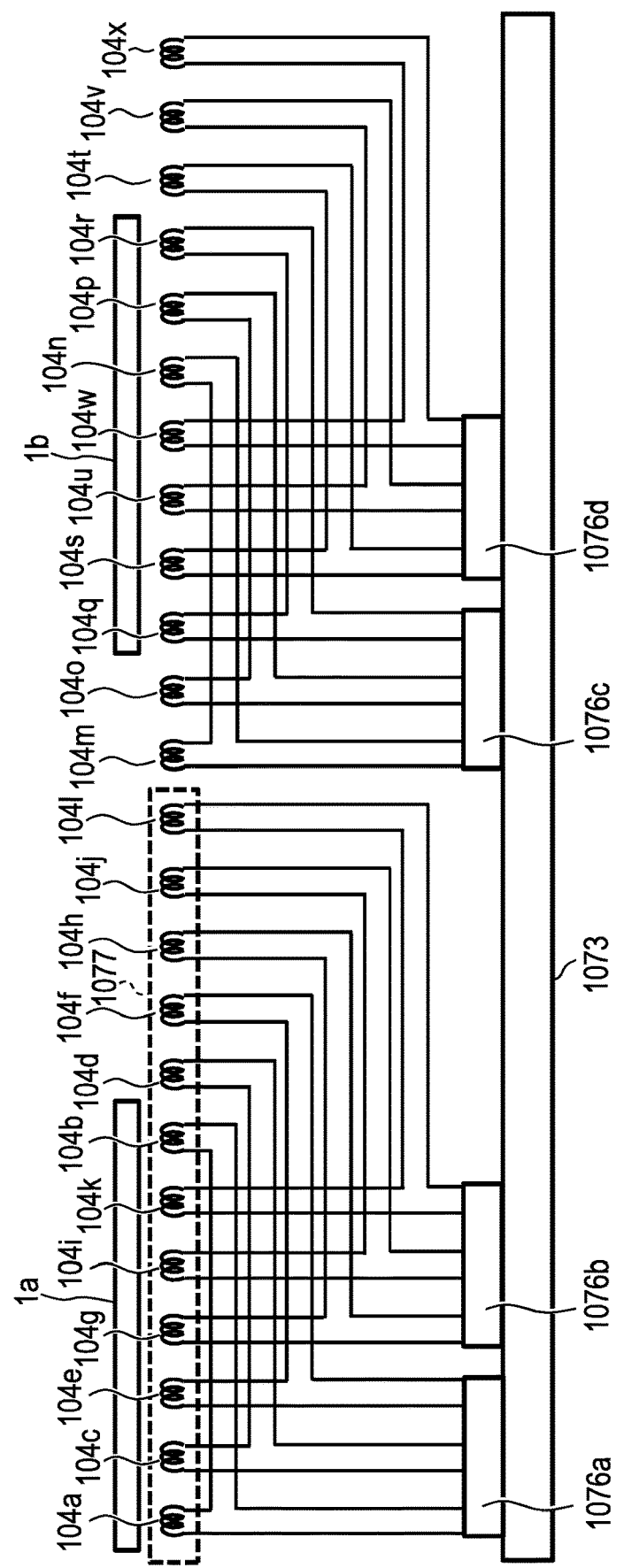
Figure 8:
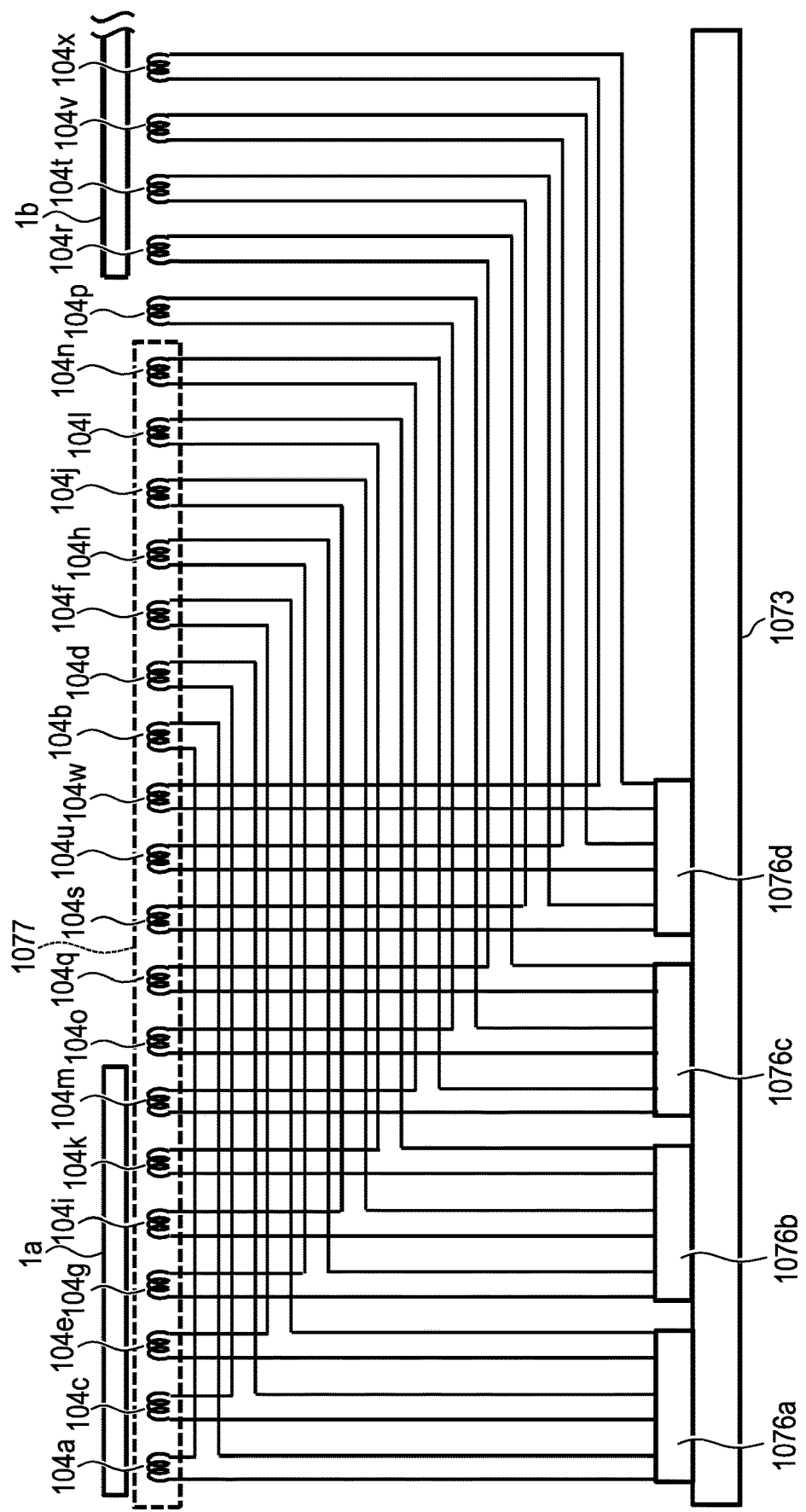

FIG. 6 to FIG. 8 are each a diagram for illustrating an overview of arrangement of series coils in the coil array 104.

In this case, it is assumed that the drive amplifier unit 1073 includes four individual drive amplifier units 1076a, 1076b, 1076c, and 1076d each having three output terminals. The number of the output terminals of the entire drive amplifier unit 1073 is twelve. The position FB control unit 1071, the current FB control unit 1072, and the current detecting unit 1074 are provided to each of the output terminals of the drive amplifier unit 1073. That is, a control unit including the position FB control unit 1071, the current FB control unit 1072, and the current detecting unit 1074 is provided to each of the twelve output terminals of the drive amplifier unit 1073.

In FIG. 6 to FIG. 8, there is illustrated an example in which the coil array 104 includes a plurality of coils 104a to 104x arranged at a certain defined pitch (hereinafter referred to as "unit pitch") along the moving direction of the carriage 1. A series coil including the coils 104a and 104b, a series coil including the coils 104c and 104d, and a series coil including the coils 104e and 104f are connected to three output terminals of the individual drive amplifier unit 1076a. A series coil including the coils 104g and 104h, a series coil including the coils 104i and 104j, and a series coil including the coils 104k and 104l are connected to three output terminals of the individual drive amplifier unit 1076b. A series coil including the coils 104m and 104n, a series coil including the coils 104o and 104p, and a series coil including the coils 104q and 104r are connected to three output terminals of the individual drive amplifier unit 1076c. A series coil including the coils 104s and 104t, a series coil including the coils 104u and 104v, and a series coil including the coils 104w and 104x are connected to three output terminals of the individual drive amplifier unit 1076d.

The configuration example of FIG. 6 is a case in which two coils forming one series coil are arranged at an interval of three unit pitches. That is, twenty-four coils forming the coil array 104 are arranged in the order of the coils 104a, 104c, 104e, 104b, 104d, 104f, 104g, 104i, 104k, 104h, 104j, 104l, 104m, 104o, 104q, 104n, 104p, 104r, 104s, 104u, 104w, 104t, 104v, and 104x along the moving direction of the carriage 1.

The configuration example of FIG. 7 is a case in which two coils forming one series coil are arranged at an interval of six unit pitches. That is, twenty-four coils forming the coil array 104 are arranged in the order of the coils 104a, 104c, 104e, 104g, 104i, 104k, 104b, 104d, 104f, 104h, 104j, 104l, 104m, 104o, 104q, 104s, 104u, 104w, 104n, 104p, 104r, 104t, 104v, and 104x along the moving direction of the carriage 1.

The configuration example of FIG. 8 is a case in which two coils forming one series coil are arranged at an interval of twelve unit pitches. That is, twenty-four coils forming the coil array 104 are arranged in the order of the coils 104a, 104c, 104e, 104g, 104i, 104k, 104m, 104o, 104q, 104s, 104u, 104w, 104b, 104d, 104f, 104h, 104j, 104l, 104n, 104p, 104r, 104t, 104v, and 104x along the moving direction of the carriage 1.

Here, it is assumed that the carriages 1a and 1b each having a length along the moving direction corresponding to seven unit pitches of the coils are moved through use of the coil array 104 having the above-mentioned arrangement.

In the configuration of the coil array 104 illustrated in the first embodiment, when an electric current flowing through one coil forming a series coil is controlled, the same electric current flows also through another coil forming the series coil, and hence the electric currents flowing through those two coils cannot be separately controlled. Therefore, when the configuration examples of FIG. 6 to FIG. 8 are compared to each other, a carriage control range 1077 in the case of control at the stop position of the carriage 1a is varied.

As described above, as the coils to be controlled, which are assigned to each of the drive units, among the plurality of coils, the coils for each predetermined interval of at least two pitches based on the distance between carriages determined in advance are assigned to each of the drive units.

In the configuration example of FIG. 6, when the carriage 1a is positioned at a place illustrated in FIG. 6, the carriage control range 1077 of the carriage 1a corresponds to a range from the coil 104a to the coil 104h. Thus, when the carriage 1b is intended to be stopped closely to the carriage 1a, the carriage 1b can be brought close to the position of the coil 104j.

Further, in order to prevent two or more carriages 1 from being opposed to two coils connected in series also in consideration of the case in which the carriages 1 are moved as well as the case in which the carriages 1 are stopped, the interval between the carriages 1a and 1b is required to be at least four unit pitches. That is, also in consideration of the case in which the carriages 1 are moved, the carriage 1b can be brought close to the position of the coil 104l when the carriage 1b is intended to be stopped closely to the carriage 1a.

In the configuration example of FIG. 6, all the six coils 104a to 104f connected to three output terminals of the individual drive amplifier unit 1076a are opposed to the carriage 1a. Therefore, a large counter-electromotive force is applied to the individual drive amplifier unit 1076a during movement of the carriage 1a. Further, a counter-electromotive force of one coil is applied to the individual drive amplifier unit 1076b during movement of the carriage 1a.

In the configuration example of FIG. 7, when the carriage 1a is positioned at a place illustrated in FIG. 7, the carriage control range 1077 of the carriage 1a corresponds to a range from the coil 104a to the coil 104l. In this configuration example, as compared to the configuration example of FIG. 6, the carriage control range 1077 of the carriage 1a is larger. Therefore, when the carriage 1b is intended to be stopped closely to the carriage 1a, the carriage 1b can be brought close only to the position of the coil 104m.

Further, in order to prevent two or more carriages 1 from being opposed to two coils connected in series also in consideration of the case in which the carriages 1 are moved as well as the case in which the carriages 1 are stopped, the interval between the carriages 1a and 1b is required to be at least seven unit pitches. That is, also in consideration of the case in which the carriages 1 are moved, the carriage 1b can be brought close only to the position of the coil 104q when the carriage 1b is intended to be stopped closely to the carriage 1a.

In the configuration example of FIG. 7, of the coils connected to three output terminals of the individual drive amplifier unit 1076a, only four coils are opposed to the carriage 1a. Therefore, as compared to the configuration example of FIG. 6, a counter-electromotive force applied to the individual drive amplifier unit 1076a during movement of the carriage 1a is smaller. Further, a counter-electromotive force of three coils is applied to the individual drive amplifier unit 1076b during movement of the carriage 1a.

In the configuration example of FIG. 8, when the carriage 1a is positioned at a place illustrated in FIG. 8, the carriage control range 1077 of the carriage 1a corresponds to a range from the coil 104a to the coil 104n. In this configuration example, as compared to the configuration example of FIG. 7, the carriage control range 1077 of the carriage 1a is larger. Therefore, when the carriage 1b is intended to be stopped closely to the carriage 1a, the carriage 1b can be brought close only to the position of the coil 104p.

Further, in order to prevent two or more carriages 1 from being opposed to two coils connected in series also in consideration of the case in which the carriages 1 are moved as well as the case in which the carriages 1 are stopped, the interval between the carriages 1a and 1b is required to be at least thirteen unit pitches. That is, also in consideration of the case in which the carriages 1 are moved, the carriage 1b can be brought close only to the position of the coil 104r when the carriage 1b is intended to be stopped closely to the carriage 1a.

In the configuration example of FIG. 8, of the coils connected to three output terminals of the individual drive amplifier unit 1076a, only three coils are opposed to the carriage 1a. Therefore, as compared to the configuration example of FIG. 7, a counter-electromotive force applied to the individual drive amplifier unit 1076a during movement of the carriage 1a is smaller. Further, during movement of the carriage 1a, a counter-electromotive force of three coils is applied to the individual drive amplifier unit 1076b, and a counter-electromotive force of one coil is applied to the individual drive amplifier unit 1076c.

In the configuration examples of FIG. 6 to FIG. 8, a total counter-electromotive force applied to the drive amplifier unit 1073 is the same. However, in the configuration example of FIG. 8, a counter-electromotive force is dispersed to the four individual drive amplifier units 1076, with the result that a counter-electromotive force applied to each of the individual drive amplifier units 1076a, 1076b, 1076c, and 1076d can be reduced.

As described above, when the plurality of carriages 1 are intended to be arranged as closely as possible, a counter-electromotive force applied to the individual drive amplifier unit 1076 during movement of the carriage 1 increases. Meanwhile, when the counter-electromotive force applied to the individual drive amplifier unit 1076 during movement of the carriage 1 is intended to be reduced, it is required to increase the interval between the plurality of carriages 1.

Thus, when the interval between the plurality of coils forming the series coils in the coil array 104 is appropriately set, the arrangement of the coils for reducing a counter-electromotive force applied to the individual drive amplifier unit 1076 can be realized in consideration of the distance between the carriages 1. That is, the interval between the coils forming the series coils in the coil array 104 can be set in accordance with the closest distance allowed between the plurality of carriages 1.

There is no particular limitation on the interval between the plurality of coils forming the series coils in the coil array 104, and the interval can be set in accordance with the closest distance between the plurality of carriages 1, for example, as described below.

Specifically, a closest distance Z between the plurality of carriages 1 can be represented by the following expression:

$$Z \geq Y \times (N \times (a-1)+1) \quad (1)$$

where Y represents an interval (unit pitch) between the coils in the coil array 104, "a" represents the number of the coils forming the series coils, and N (N unit pitch) represents an interval between the plurality of coils forming the series coils.

Thus, the interval N between the coils satisfying the relationship of the expression (1) can be selected based on the interval Y between the coils in the coil array 104, the number "a" of the coils forming the series coils, and the closest distance Z between the carriages 1. For example, when the number "a" of the coils forming the series coils is 2, and the closest distance Z between the carriages 1 is four unit pitches, the interval N between the plurality of coils forming the series coils can be set to three unit pitches (3Y)

or less (corresponding to the configuration example of FIG. 6). Further, when the number "a" of the coils forming the series coils is 2, and the closest distance Z between the carriages 1 is seven unit pitches, the interval N between the plurality of coils forming the series coils can be set to six unit pitches (6Y) or less (corresponding to the configuration example of FIG. 7). Further, when the number "a" of the coils forming the series coils is 2, and the closest distance Z between the carriages 1 is thirteen unit pitches, the interval N between the plurality of coils forming the series coils can be set to twelve unit pitches (12Y) or less (corresponding to the configuration example of FIG. 8).

With this, the interval N between the coils can be selected based on the required interval between the carriages 1 so that two or more carriages 1 are not opposed to "a" coils forming the series coils also in consideration of the case in which the carriages 1 are moved as well as the case in which the carriages 1 are stopped.

In FIG. 9A to FIG. 9D, there is illustrated a state in which the carriage 1a having a size of seven unit pitches moves to the right side by one unit pitch when the coil array 104 in the configuration example illustrated in FIG. 6 is used.

Figure 9A:
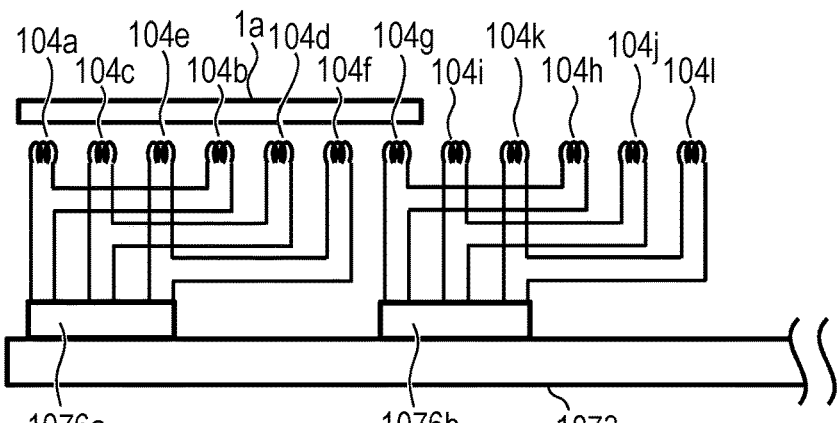
FIG. 9A, FIG. 9B, FIG. 9C, and FIG. 9D are each a diagram for illustrating an overview of switching of a control unit in the conveyance system according to the first embodiment of the present invention.

When the carriage 1a is positioned at a place illustrated in FIG. 9A, the carriage 1a is opposed to the coils 104a to 104f connected to three output terminals of the individual drive amplifier unit 1076a. Further, the carriage 1a is opposed to the coil 104g connected to one output terminal of the individual drive amplifier unit 1076b. That is, the carriage 1a is controlled by three control units of the individual drive amplifier unit 1076a and one control unit of the individual drive amplifier unit 1076b.

Figure 9B:
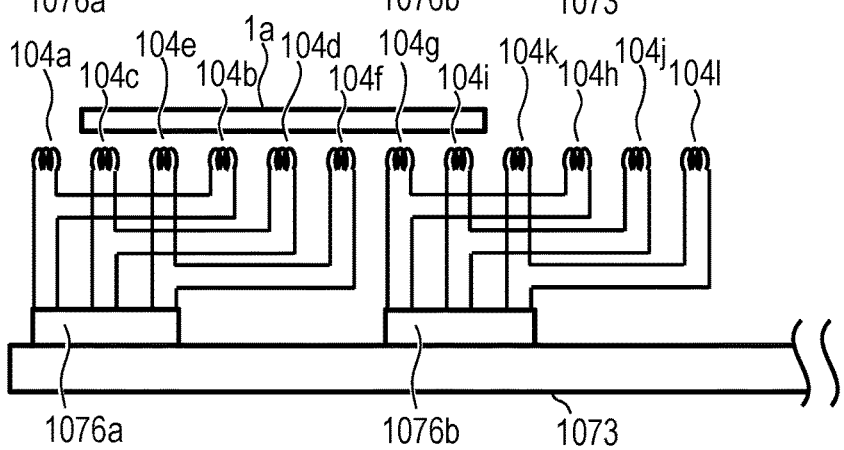

Further, when the carriage 1a is positioned at a place illustrated in FIG. 9B, the carriage 1a is opposed to the coils 104b to 104f connected to three output terminals of the individual drive amplifier unit 1076a. Further, the carriage 1a is opposed to the coils 104g and 104i connected to two output terminals of the individual drive amplifier unit 1076b. That is, the carriage 1a is controlled by three control units of the individual drive amplifier unit 1076a and two control units of the individual drive amplifier unit 1076b.

Figure 9C:
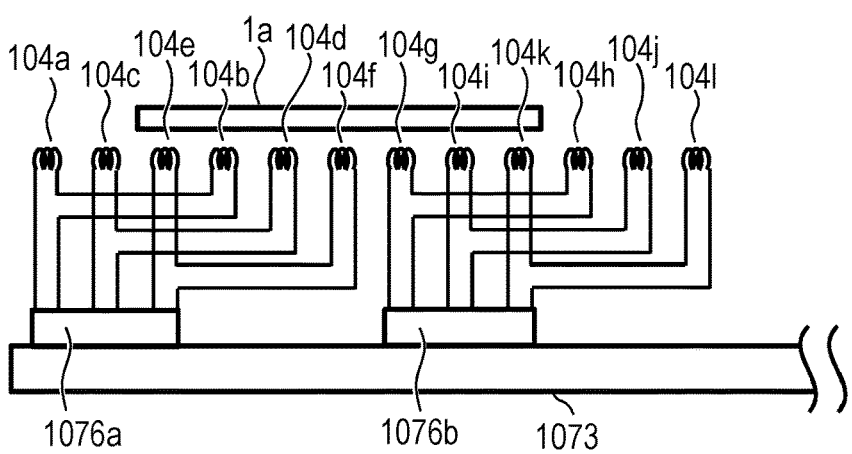

Further, when the carriage 1a is positioned at a place illustrated in FIG. 9C, the carriage 1a is opposed to the coils 104b and 104d to 104f connected to three output terminals of the individual drive amplifier unit 1076a. Further, the carriage 1a is opposed to the coils 104g, 104i, and 104k connected to three output terminals of the individual drive amplifier unit 1076b. That is, the carriage 1a is controlled by three control units of the individual drive amplifier unit 1076a and three control units of the individual drive amplifier unit 1076b.

Figure 9D:
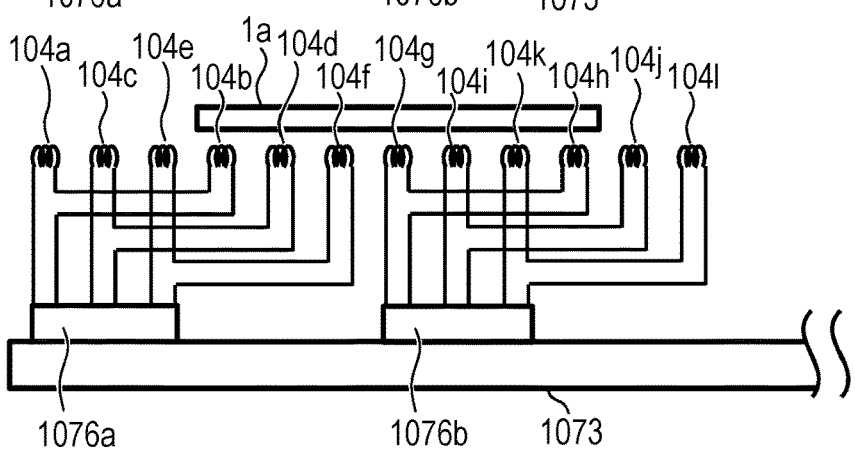

Further, when the carriage 1a is positioned at a place illustrated in FIG. 9D, the carriage 1a is opposed to the coils 104b, 104d, and 104f connected to three output terminals of the individual drive amplifier unit 1076a. Further, the carriage 1a is opposed to the coils 104g to 104i and 104k connected to three output terminals of the individual drive amplifier unit 1076b. That is, the carriage 1a is controlled by three control units of the individual drive amplifier unit 1076a and three control units of the individual drive amplifier unit 1076b.

As described above, the carriage 1 can be controlled by the minimum required number of control units by switching the number of the control units configured to control the carriage 1 in accordance with the position of the carriage 1. With this, when the plurality of carriages 1 are caused to travel and stop simultaneously, the carriages 1 can be controlled under a state in which the carriages 1 are brought closer to each other.

When the size of the carriage 1 is changed, the number of the coils to be opposed to the carriage 1 is also changed. Therefore, the number of the control units configured to control the carriage 1a is also appropriately changed.

In the processing system 10 illustrated in FIG. 1, in the conveyance path 1000a on the going path side, the plurality of carriages 1 are stopped before the process, and hence the interval between the carriages 1 that are stopped on the conveyance path 1000a is decreased. Further, when the distance between the processes is small, the stopped carriages 1 are congested, and hence the moving distance of the carriage 1 moving to the subsequent process is small, and the moving speed of the carriage 1 is small. Therefore, a large counter-electromotive force is not applied to the coils forming the coil array 104.

Thus, in the conveyance path 1000a on the going path side, when the arrangement of the coil array 104 is selected from, for example, the configuration examples of FIG. 6 to FIG. 8, it is appropriate that the configuration example of FIG. 6, in which the interval between the coils forming the series coils is small, be selected. With this, the stop interval between the carriages 1 can be reduced.

Meanwhile, in the conveyance path 1000b on the return path side, the workpiece 5 is not subjected to processing, and hence the number of the carriages 1 stopped on the conveyance path 1000b is small, with the result that the interval between the carriages 1 is large. Therefore, the moving distance and the moving speed of the carriage 1 are increased, and a large counter-electromotive force is applied to the coils forming the coil array 104 in some cases.

Thus, in the conveyance path 1000b on the return path side, when the arrangement of the coil array 104 is selected from, for example, the configuration examples of FIG. 6 to FIG. 8, it is appropriate that the configuration example of FIG. 8, in which the interval between the coils forming the series coils is large, be selected. With this, a large counter-electromotive force can be prevented, and the maximum speed during movement of the carriage 1 can be increased.

Thus, the arrangement of the coil array 104 in which the interval between the coils forming the series coils is small can be employed on the conveyance path 1000a side, and the arrangement of the coil array 104 in which the interval between the coils forming the series coils can be employed on the conveyance path 1000b side. In this case, the coil arrays 104 having different intervals between the coils forming the series coils are present in the conveyance passage.

Through use of the coil arrays 104 having different intervals between the coils forming the series coils, a counter-electromotive force to be generated can be reduced in consideration of the distance between the carriages 1.

As described above, according to the first embodiment, the movement of the carriages can be appropriately controlled in accordance with the distance between the carriages and a counter-electromotive force generated in the coils.

Second Embodiment

A conveyance system and a processing system in a second embodiment of the present invention are described with reference to FIG. 10A to FIG. 11B. The same components as those of the conveyance system and the processing system in the first embodiment are denoted by the same reference symbols as those therein, and description thereof is omitted or simplified. FIG. 10A to FIG. 11B are each a diagram for illustrating a connection mode between a drive amplifier unit and a coil array in the conveyance module in the second embodiment.

The conveyance system 12 and the processing system 10 in the second embodiment are the same as the conveyance system 12 and the processing system 10 in the first embodiment except that the connection mode between the drive amplifier unit 1073 and the coil array 104 of the conveyance module 110 is different. That is, the conveyance module 110 of the conveyance system 12 and the processing system 10 in the second embodiment further includes a switching unit between the drive amplifier unit 1073 and the coil array 104, which is configured to switch the connection therebetween.

Figure 10A:
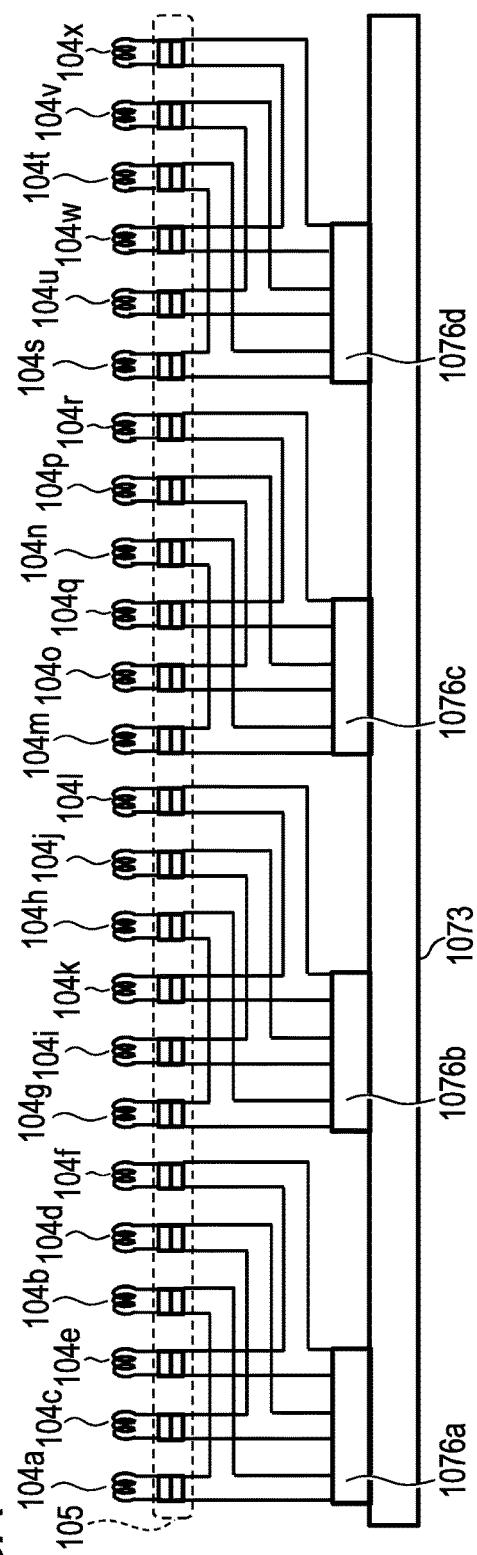
FIG. 10A, FIG. 10B, FIG. 11A, and FIG. 11B are each a diagram for illustrating a schematic configuration of a switching unit in a conveyance system according to a second embodiment of the present invention.
Figure 10B:
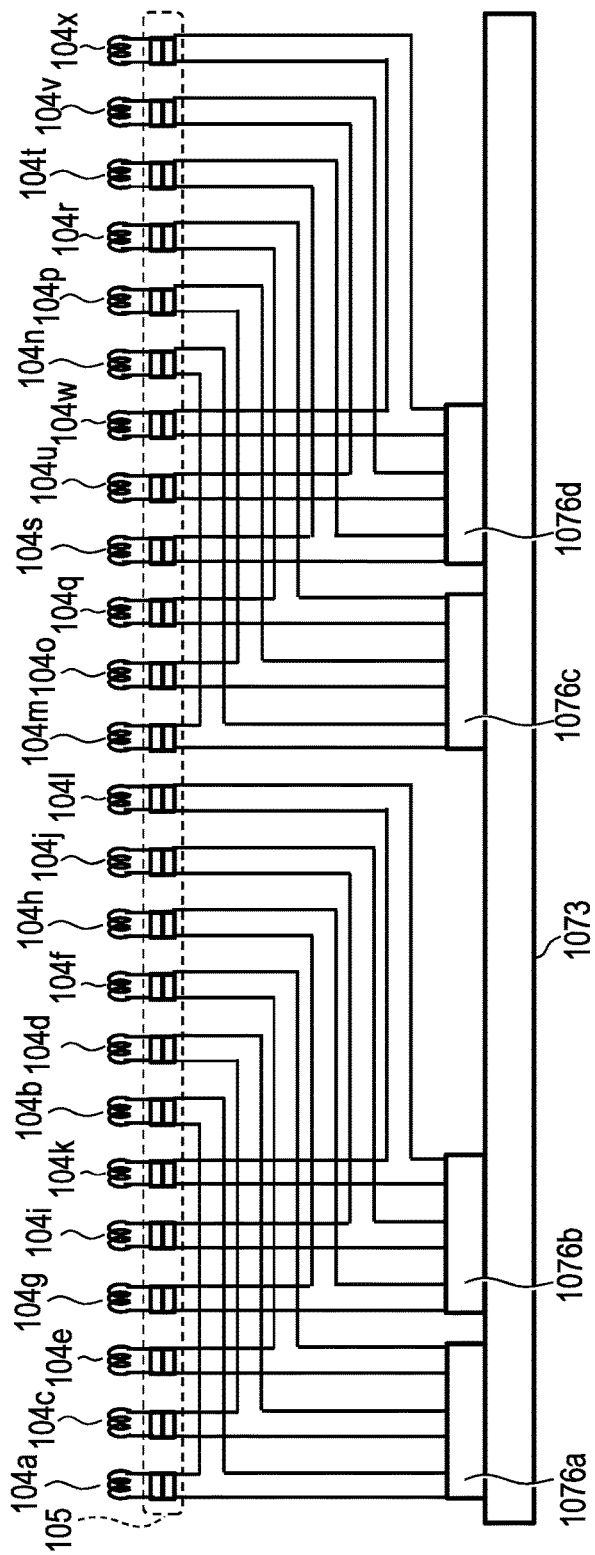

In a configuration example illustrated in FIG. 10A and FIG. 10B, the respective coils 104a to 104x forming the coil array 104 and the individual drive amplifiers 1076 are connected to each other through intermediation of a connector 105. The connector 105 configured to connect the respective coils 104a to 104x and the individual drive amplifier units 1076 to each other corresponds to the switching unit.

The configuration of the coil array 104 can be easily switched by changing the connection between the respective coils 104a to 104x and the individual drive amplifier units 1076 in the connector 105. For example, in FIG. 10A, there is illustrated an example in which the respective coils 104a to 104x and the individual drive amplifier units 1076 are connected to each other through the connector 105 so that two coils forming one series coil are arranged at an interval of three unit pitches. Further, in FIG. 10B, there is illustrated an example in which the respective coils 104a to 104x and the individual drive amplifier units 1076 are connected to each other through the connector 105 so that two coils forming one series coil are arranged at an interval of six unit pitches.

Further, the configuration of the coil array 104 may be switched by changing the positions of the coils 104a to 104x without changing the connection between the respective coils 104a to 104x and the individual drive amplifier units 1076.

Figure 11A:
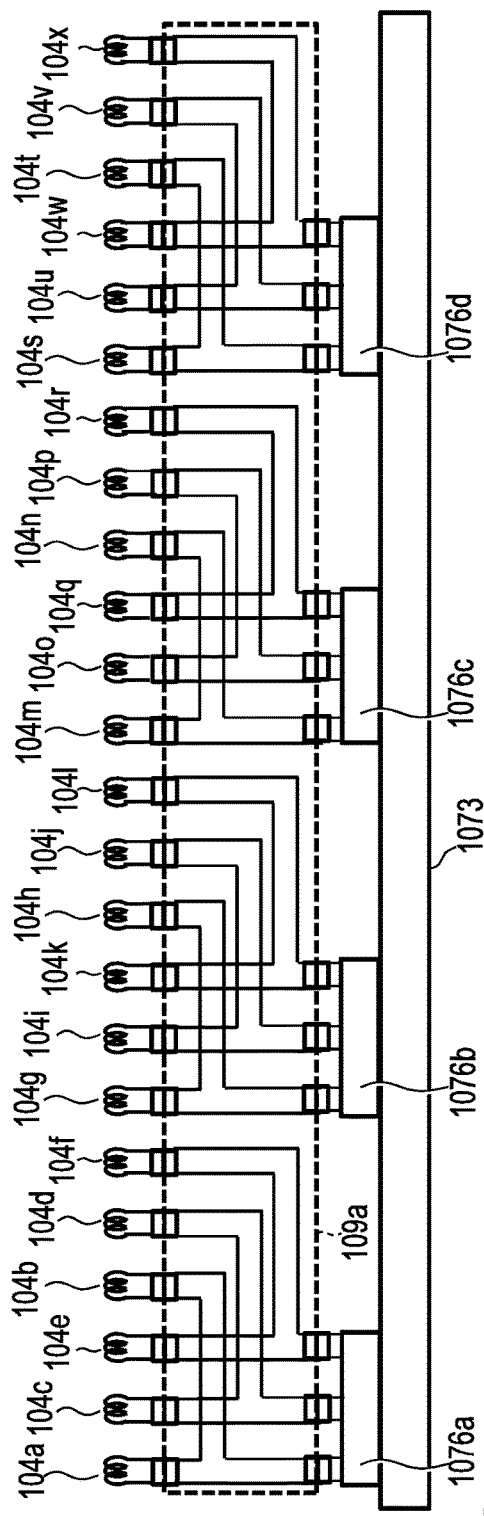
Figure 11B:
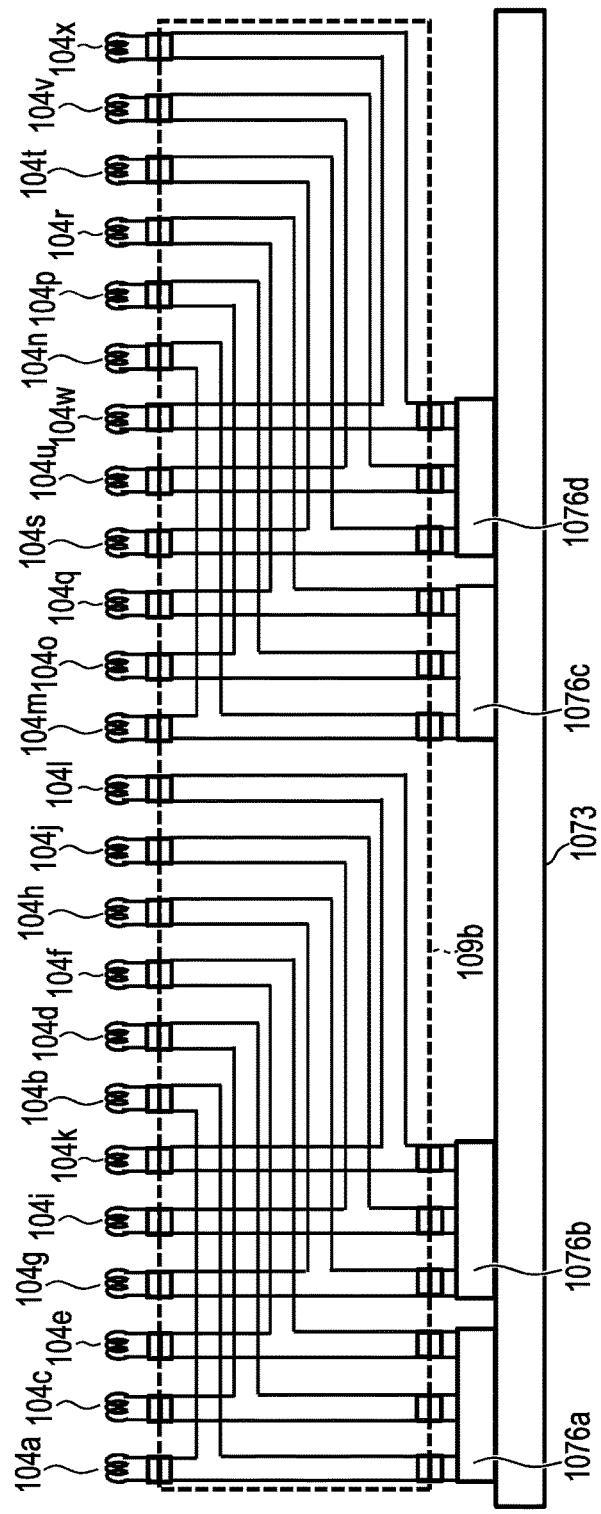

In a configuration example illustrated in FIG. 11A and FIG. 11B, the respective coils 104a to 104x forming the coil array 104 and the individual drive amplifier units 1076 are connected to each other through intermediation of a switching relay board 109. The switching relay board 109 configured to connect the respective coils 104a to 104x and the individual drive amplifier units 1076 to each other corresponds to the switching unit.

The configuration of the coil array 104 can be easily switched by changing the switching relay board 109 configured to connect the respective coils 104a to 104x and the individual drive amplifier units 1076 to each other. For example, in FIG. 11A, there is illustrated an example using a switching relay board 109a configured to connect the respective coils 104a to 104x to the individual drive amplifier units 1076 so that two coils forming one series coil are arranged at an interval of three unit pitches. Further, in FIG. 11B, there is illustrated an example using a switching relay board 109b configured to connect the respective coils 104a to 104x to the individual drive amplifier units 1076 so that two coils forming one series coil are arranged at an interval of six unit pitches.

The connection between the respective coils 104a to 104x and the individual drive amplifier units 1076 may be changed by replacing the switching relay board 109 itself or by switching a circuit in the switching relay board 109 in accordance with a signal from outside.

As described above, the connection between the drive amplifier unit 1073 and the coil array 104 can be easily switched by connecting the drive amplifier unit 1073 and the coil array 104 to each other through use of the connector 105 or the switching relay board 109.

Thus, switching is flexibly adaptable, for example, by switching the connection to the one illustrated in FIG. 10A or FIG. 11A when it is required to decrease the interval between the plurality of carriages 1 or by switching the connection to the one illustrated in FIG. 10B or FIG. 11B when it is required to suppress a counter-electromotive force during movement.

As described above, according to the second embodiment, the movement of the carriages can be appropriately controlled in accordance with the distance between the carriages and a counter-electromotive force generated in the coils. Further, the operation mode can be easily switched by connecting the coil array 104 and the individual drive amplifier unit 1076 to each other through use of the connector 105 or the switching relay board 109.

Modified Embodiments

The present invention can be variously modified without being limited to the above-mentioned embodiments.

For example, in the above-mentioned embodiments, the examples in which the conveyance apparatus and the conveyance system according to the present invention are applied to a processing system for a production line for assembling industrial products are described. However, the conveyance apparatus and the conveyance system according to the present invention may be applied to systems other than the above-mentioned processing system.

According to the present invention, the movement of the carriages can be appropriately controlled in accordance with the distance between the carriages and a counter-electromotive force generated in the coils.

While the present invention has been described with reference to exemplary embodiments, it is to be understood that the invention is not limited to the disclosed exemplary embodiments. The scope of the following claims is to be accorded the broadest interpretation so as to encompass all such modifications and equivalent structures and functions.

This application claims the benefit of Japanese Patent Application No. 2017-184100, filed Sep. 25, 2017 which is hereby incorporated by reference herein in its entirety.

What is claimed is:
1. A conveyance system comprising:
a plurality of coils arranged so as to form a row at a predetermined pitch;
a carriage configured to move along the row of the plurality of coils through use of an electromagnetic force received from the plurality of coils as a driving force;
a plurality of drivers configured to cause an electric current to flow through coils to be controlled among the plurality of coils to provide the driving force to the carriage; and
a controller configured to switch the coils to be controlled, which are assigned to each of the plurality of drivers, among the plurality of coils,
wherein, as the coils to be controlled, which are assigned to each of the plurality of drivers, among the plurality of coils, coils for each predetermined interval of at least two pitches based on a distance between carriages determined in advance are assigned to each of the plurality of drivers, wherein the plurality of coils include a plurality of series coils each including a predetermined number of the coils connected in series, and the predetermined number of the coils forming each of the plurality of series coils are arranged at a predetermined interval of at least two units each having the predetermined pitch, and wherein the plurality of drivers include a plurality of control units, which are provided so as to correspond to the plurality of series coils, respectively, and configured to control each electric current flowing through the plurality of series coils.

2. The conveyance system according to claim 1, wherein the predetermined interval is set so as to satisfy the following relationship:

$$Z \geq Y \times (N \times (a-1)),$$

where Y represents the predetermined pitch, "a" represents the predetermined number, Z represents a closest distance between the carriages, and N unit pitch represents the predetermined interval.

3. The conveyance system according to claim 1, wherein the controller is configured to switch the plurality of drivers configured to control the carriage in accordance with a position and a size of the carriage.

4. The conveyance system according to claim 1, wherein the carriage travels on a passage including a first conveyance path in which the predetermined interval of the predetermined number of the coils forming the plurality of series coils is a first interval and a second conveyance path in which the predetermined interval of the predetermined number of the coils forming the plurality of series coils is a second interval different from the first interval.

5. The conveyance system according to claim 1, further comprising a switching unit configured to switch the predetermined interval of the predetermined number of the coils forming the plurality of series coils.

6. The conveyance system according to claim 5, wherein the switching unit includes a connector provided between the plurality of series coils and the plurality of drivers.

7. The conveyance system according to claim 5, wherein the switching unit includes a switching relay board provided between the plurality of series coils and the plurality of drivers.

8. The conveyance system according to claim 1, further comprising a processing device configured to perform processing with respect to a workpiece conveyed by the carriage.

9. A conveyance apparatus comprising:
a plurality of coils, arranged so as to form a row at a predetermined pitch, and configured to move a carriage along the row of the plurality of coils through use of an electromagnetic force to be generated as a driving force;
a plurality of drivers configured to cause an electric current to flow through coils to be controlled among the plurality of coils to provide the driving force to the carriage; and
a controller configured to switch the coils to be controlled, which are assigned to each of the plurality of drivers, among the plurality of coils,
wherein, as the coils to be controlled, which are assigned to each of the plurality of drivers, among the plurality of coils, coils for each predetermined interval of at least two pitches based on a distance between carriages determined in advance are assigned to each of the plurality of drivers, wherein the plurality of coils include a plurality of series coils each including a predetermined number of the coils connected in series, and the predetermined number of the coils forming each of the plurality of series coils are arranged at a predetermined interval of at least two units each having the predetermined pitch, and wherein the plurality of drivers include a plurality of control units, which are provided so as to correspond to the plurality of series coils, respectively, and configured to control each electric current flowing through the plurality of series coils.

10. A method of controlling a conveyance system including:
a plurality of coils, arranged so as to form a row at a predetermined pitch, and configured to move a carriage along the row of the plurality of coils through use of an electromagnetic force to be generated as a driving force;
a plurality of drivers configured to cause an electric current to flow through coils to be controlled among the plurality of coils to provide the driving force to the carriage; and
a controller configured to switch the coils to be controlled, which are assigned to each of the plurality of drivers, among the plurality of coils,
the method comprising:
conveying a workpiece by the carriage; and
performing processing with respect to the workpiece conveyed by the carriage,
wherein, as the coils to be controlled, which are assigned to each of the plurality of drivers, among the plurality of coils, coils for each predetermined interval of at least two pitches based on a distance between carriages determined in advance are assigned to each of the plurality of drivers, wherein the plurality of coils include a plurality of series coils each including a predetermined number of the coils connected in series, and the predetermined number of the coils forming each of the plurality of series coils are arranged at a predetermined interval of at least two units each having the predetermined pitch, and wherein the plurality of drivers include a plurality of control units, which are provided so as to correspond to the plurality of series coils, respectively, and configured to control each electric current flowing through the plurality of series coils.

11. A conveyance system comprising:
a plurality of coils arranged so as to form a row at a predetermined pitch;
a carriage configured to move along the row of the plurality of coils through use of an electromagnetic force received from the plurality of coils as a driving force;
a plurality of drivers configured to cause an electric current to flow through coils to be controlled among the plurality of coils to provide the driving force to the carriage; and
a controller configured to switch the coils to be controlled, which are assigned to each of the plurality of drivers, among the plurality of coils,
wherein, as the coils to be controlled, which are assigned to each of the plurality of drivers, among the plurality of coils, coils for each predetermined interval of at least two pitches based on a distance between carriages determined in advance are assigned to each of the plurality of drivers, and wherein the controller is configured to switch the plurality of drivers configured to control the carriage in accordance with a position and a size of the carriage.

12. A conveyance apparatus comprising:

a plurality of coils arranged so as to form a row at a predetermined pitch, and configured to move a carriage along the row of the plurality of coils through use of an electromagnetic force to be generated as a driving force;

a plurality of drivers configured to cause an electric current to flow through coils to be controlled among the plurality of coils to provide the driving force to the carriage; and a controller configured to switch the coils to be controlled, which are assigned to each of the plurality of drivers, among the plurality of coils, wherein, as the coils to be controlled, which are assigned to each of the plurality of drivers, among the plurality of coils, coils for each predetermined interval of at least two pitches based on a distance between carriages determined in advance are assigned to each of the plurality of drivers, and wherein the controller is configured to switch the plurality of drivers configured to control the carriage in accordance with a position and a size of the carriage.

13. A method of controlling a conveyance system including:

a plurality of coils arranged so as to form a row at a predetermined pitch, and configured to move a carriage along the row of the plurality of coils through use of an electromagnetic force to be generated as a driving force;

a plurality of drivers configured to cause an electric current to flow through coils to be controlled among the plurality of coils to provide the driving force to the carriage; and a controller configured to switch the coils to be controlled, which are assigned to each of the plurality of drivers, among the plurality of coils, the method comprising:

conveying a workpiece by the carriage; and performing processing with respect to the workpiece conveyed by the carriage, wherein, as the coils to be controlled, which are assigned to each of the plurality of drivers, among the plurality of coils, coils for each predetermined interval of at least two pitches based on a distance between carriages determined in advance are assigned to each of the plurality of drivers, and wherein the controller is configured to switch the plurality of drivers configured to control the carriage in accordance with a position and a size of the carriage.

* * * * *